May 11, 1926.
W. E. KERNS
LENS
Filed Jan. 16, 1925
1,583,886
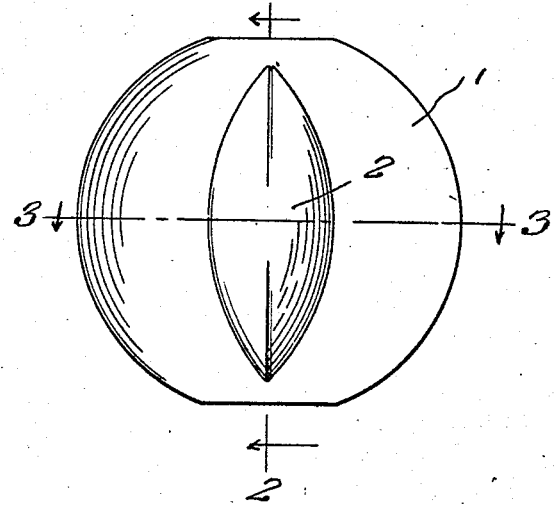
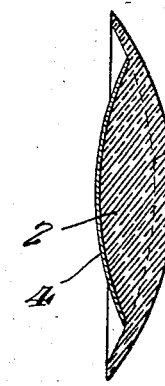
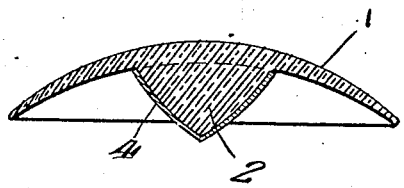
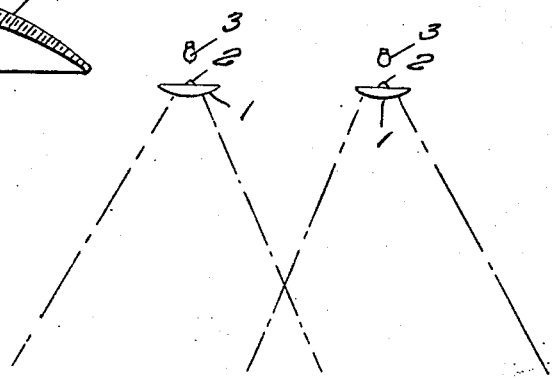
Inventor
W. E. Kerns
By Clarence O'Brien
Attorney Patented May 11, 1926.

1,583,886

UNITED STATES PATENT OFFICE.

WILLIAM E. KERNS, OF MALVERN, IOWA.

LENS.

Application filed January 16, 1925. Serial No. 2,849.

This invention relates to improvements in automobile headlight lenses and has for its primary object to provide a means whereby the rays of light from the lamp will be deflected outwardly on opposite sides over the vertical plane of the lens.

One of the important objects of the present invention is to provide a lens construction of the above mentioned character, whereby the rays of light from the lamp will be distributed more to the side of the road, thus enabling the operator of a motor vehicle to have a full view of the road, and more particularly the sides of the road.

A further object is to provide a lens construction of the above mentioned character, which is simple in construction, inexpensive, strong and durable, and further well adapted for the purpose for which it is designated.

Other objects and advantages of this invention will become apparent during the course of the following description.

In the accompanying drawing, forming a part of this specification, and in which like numerals designate like parts throughout the same:

Figure 1 is an inside elevation of the lens, embodying my invention.

Figure 2 is a vertical section, taken approximately on the line 2—2 of Figure 1.

Figure 3 is a horizontal section, taken approximately on the line 3—3 of Figure 1, and Figure 4 is a diagrammatic view showing a pair of lenses associated with the respective lamps, and illustrating the manner in which the rays of light are directed outwardly through the lenses.

In the drawing, wherein for the purpose of illustration is shown the preferred embodiment of my invention, the numeral 1 designates a substantially convex concavo lens adapted for use in conjunction with an automobile headlight. A substantially elliptical shaped projection, designated generally by the numeral 2 is molded or otherwise formed on the concaved face of the lens, the projection being disposed in a vertical plane at the approximate center of the lens. Furthermore, the projection is substantially triangular in cross section, as clearly illustrated in Figure 3, the sides thereof being slightly convex. As illustrated in Figure 2, the projection decreased gradually in thickness from its center toward its respective ends.

The projection is adapted to be painted as at 4, whereby the same is rendered opaque, while the convex-concavo lens 1 is transparent.

The apex of the projection 2 is spaced from the lamp 3 of each of the headlights of an automobile, as clearly illustrated in Figure 4 of the drawings. It is obvious that when the lights of the headlights are turned on, the rays of light therefrom will be projected outwardly on opposite sides of the projection 2, causing a wider beam of light to be thrown onto the road, whereby the sides thereof may be illuminated, so as to enable the operator of an automobile to readily have a full view of the road, and prevent any danger of going off of the side thereof in passing other vehicles, or when making a turn. Furthermore, the provision of a lens construction of the above mentioned character will prevent the glare of the light dazzling the operator of an approaching vehicle.

While I have shown the preferred embodiment of my invention, it is to be understood that various changes in the size, shape, and arrangement of parts may be resorted to, without departing from the spirit of the invention and the scope of the appended claim.

Having thus described my invention, what I claim as new is:

In combination, a concavo-convex lens, a projection on the concaved surface of the lens having its median longitudinal dimension disposed vertical, said projection tapering from its intermediate portion toward its ends and being substantially triangular shape in horizontal cross section for forming a pair of side faces which are substantially convexed, such projection being opaque.

In testimony whereof I affix my signature.

WILLIAM E. KERNS.